Figure 1:
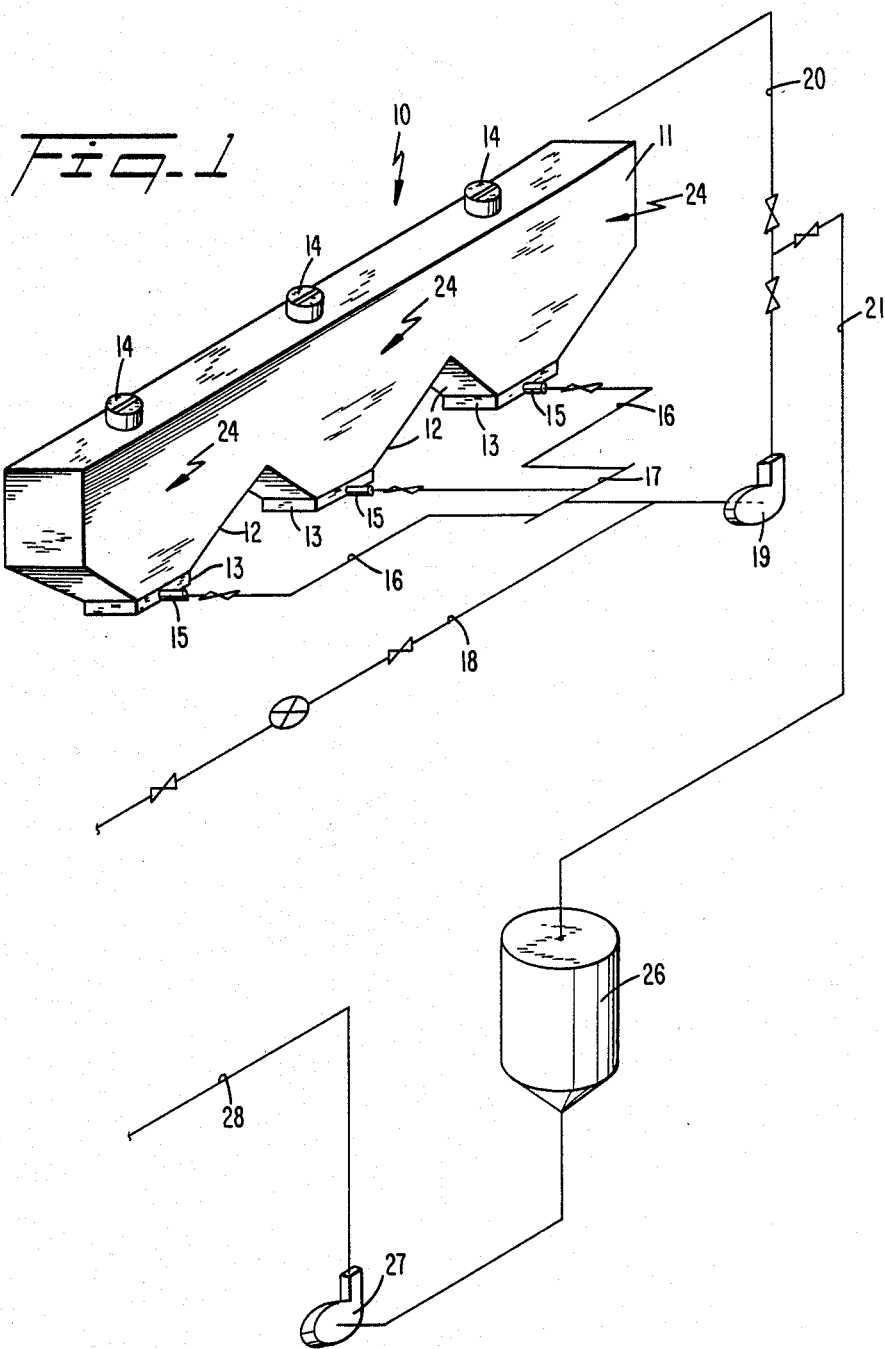

United States Patent [19]

Turska

[11] Patent Number: 4,844,664
[45] Date of Patent: Jul. 4, 1989

[54] CONDUIT AIR DISPENSER FOR IMPROVED IN-CAR SLURRYING

[75] Inventor: Carl J. Turska, Harve de Grace, Md.

[73] Assignee: J. M. Huber Corporation, Rumson, N.J.

[21] Appl. No.: 98,998

[22] Filed: Sep. 21, 1987

[51] Int. Cl.$^4$ ............................................. B65G 53/30
[52] U.S. Cl. ..................... 406/46; 406/134; 406/145; 366/107
[58] Field of Search ................... 406/46–48, 406/39, 134, 136, 137, 141, 142, 145, 197; 366/101, 107, 184

[56] References Cited

U.S. PATENT DOCUMENTS

| | | | |
|---|---|---|---|
| 1,347,358 | 7/1920 | Adams | 406/137 |
| 1,351,026 | 8/1920 | Scrapo et al. | 406/39 |
| 2,609,185 | 9/1952 | Eisner | 406/137 X |
| 3,006,693 | 10/1961 | Claunch, Jr. et al. | 406/170 |
| 3,198,492 | 8/1965 | Schneider | 366/107 |
| 3,276,753 | 10/1966 | Solt et al. | 366/107 |
| 3,481,116 | 12/1969 | Ferri | 406/39 |
| 3,512,842 | 5/1970 | Milewski et al. | 406/48 |
| 3,671,018 | 6/1972 | McKibben et al. | 366/107 |
| 4,189,262 | 2/1980 | Anderson | 406/136 |
| 4,505,214 | 3/1985 | Tjebbes et al. | 406/39 |

FOREIGN PATENT DOCUMENTS

| | | | |
|---|---|---|---|
| 91287 | 8/1978 | Japan | 366/107 |
| 91289 | 8/1978 | Japan | 406/46 |

*Primary Examiner*—Sherman D. Basinger
*Assistant Examiner*—Paul Salmon
*Attorney, Agent, or Firm*—Harold H. Flanders; Alec H. Horn; Robert L. Price

[57] ABSTRACT

An apparatus and method for improved in-car slurrying of dry bulk powder is described. The apparatus includes a plurality of mutually spaced conduits which extend downwardly from a manifold through the center of each hopper compartment in a hopper car, each conduit opening about one foot above the bottom of the compartment. As water is admitted at the bottom of each compartment, air under pressure is dispensed through the conduits to aerate the center of the bulk powder in each compartment, and the conduits themselves provide a path for the water upwardly through the center of the bulk powder.

9 Claims, 2 Drawing Sheets

CONDUIT AIR DISPENSER FOR IMPROVED IN-CAR SLURRYING

FIELD OF THE INVENTION

This invention is directed to the movement of bulk pulverulent materials having a mean diameter in the submicron range and in particular to the slurry unloading of dry bulk powder from railroad hopper cars or the like.

BACKGROUND OF THE INVENTION

The shipment of dry bulk powder materials in, for example, railroad hopper cars results in settling or compacting of the materials. When materials such as amorphous sodium alumino silicate pigments arrive at a users plant various methods have been proposed for moving the pigment from the railroad hopper car to storage facility for subsequent use.

In U.S. Pat. No. 3,512,842 owned by the assignee of this invention, it was proposed to introduce warm water into the dry bulk powder to form a slurry. The particles would then wet out after a soaking period of several hours. Air was subsequently interjected into the slurry to facilitate the formation of a homogeneous slurry which would be suitable for pumping. Air was introduced through pipes mounted along the sides and bottom of the hopper with multiple holes spaced for expelling air under pressure. Typically the pipes were one half inch in diameter with 3/16 inch holes spaced about one foot apart and air pressure of 80 to 100 pounds per square inch (gauge) was used.

Water at a temperature of between 73° F. and 100° F. was introduced at the bottom of the hopper at a low controlled rate to make up a slurry containing about 2.3 to 2.4 pounds of sodium alumino silicate per gallon.

The patent further describes that after air agitation the slurry is recycled by pumping the slurry from the bottom of the hopper car and returning it to the top to further assist in forming a homogenous slurry. The slurry then could be pumped to a storage tank for use later in the plant.

This procedure requires high capacity pumps. While at rest the slurry material often became a jelly like material requiring further agitation to become fluid. In addition, a concentration in excess of about 2.4 pounds per gallon had such a high viscosity that pumping was difficult.

Subsequently, in U.S. Pat. No. 4,036,663 also assigned to the assignee of this invention an alternate procedure was proposed wherein a finely divided deliquescent salt was admixed with the dry powder before water was admitted. The salt was typically blended in a weight range of about 0.1% to 3% by weight of the pigment mixture before slurrying. While this procedure was effective, it increased the cost of the pigment and required a facility for the dry mixing step.

A further effort to improve the off loading of dry powder is described in U.S. Pat. No. 4,189,262. In that patent a plurality of aeration devices are mounted in the bottom of the hopper. The aeration devices were as disclosed in U.S. Pat. No. 3,929,261 and included a head with a movable flap which fluttered as air passed through the head and into the surrounding powder material.

Problems remain however in circulating the water admitted at the bottom of the hopper upwardly through the packed bulk material without bypassing clumps which are not subsequently broken up or caking of the material at the top of the hopper compartment.

SUMMARY OF THE INVENTION

It has been discovered that if air is admitted through a plurality of pipes which extend downwardly through the mass of dry powder and opening adjacent the bottom of the hopper, which pipes are of varying lengths to accommodate the sloping walls of the hopper, aeration will assist in slurry formation, and in addition the pipes themselves serve to facilitate circulation of water upwardly. Air dispensed at different levels throughout the center of the dry bulk densified or semidensified powder thus results in a parting of the particles of powder permitting water to flow up in the center of the compartment for successful wet out of the powder. The tubes extending down through the compartment also aid circulation of the water upwardly by capillary action.

Accordingly, it is an object of this invention to provide a construction for railroad hopper cars and the like to facilitate forming a water slurry of bulk dry powder materials shipped therein to facilitate unloading of such cars.

It is another object to provide a manifold with pipes of varying lengths which extend downwardly through the packed material opening onto the bottom and the sides of the hopper so that when air is forced therethrough the densest material in the bottom of the hopper will be aerated while water admitted at the bottom of the hopper will rise up along the pipes in the center of the hopper and to facilitate wet out of the powder materials.

These and other objects will become readily apparent with reference to the drawings and following description wherein:

BRIEF DESCRIPTION OF THE DRAWINGS

FIG. 1 is a schematic view of a hopper car with associated piping for unloading a slurry.

FIG. 2 is a side view and cross section of a hopper utilizing the improvement of this invention.

FIG. 3 is a cross sectional view taken along line 3 of FIG. 2 with the sides of the hopper removed.

DETAILED DESCRIPTION OF THE INVENTION

FIG. 1 is a schematic showing the system generally used to slurry unload dry bulk powder shipments. That system is similar to that disclosed in U.S. Pat. No. 3,512,842 and accordingly the disclosure of that patent is hereby incorporated by reference. The instant invention is intended to be either a modification of or an addition to this system as will be subsequently explained.

Referring to FIG. 1, a typical railroad hopper car 10 is intended to be modified according to the following description.

The hopper car 10 generally has a body 11 and a plurality of hoppers 12 depending therefrom. The hoppers 12 have generally rectangular boxes 13, and the car is provided with filling domes 14 to give access to the interior 11 of the car for filling with a dry powder material.

A pipe coupling 15 is provided in box 13, and coupling 15 is intended to be attached to water line 16 during the slurry process. As will be obvious to those skilled in the art appropriate valves are provided in line 16. Conduits 16 extend from a manifold 17 which in turn is fed by a water line 18. A pump 19 is connected to manifold 17 and is adapted to pump slurry through a recycle line 20 or a product line 21 which extends to a storage tank 26. Storage tank 26 is connected to pump 27 for pumping the slurry through line 28 to its point of use in the plant.

The water supply line 18, as will be obvious to those skilled in the art can be provided with a water meter and a temperature gauge when warm water is to be used.

Typically a pneumatic agitator system is provided within each hopper 12 fed by conduits 24 which connect the pneumatic aeration system as will be subsequently described with a remote source of compressed air (not shown). The pneumatic system described in the above identified patent included a plurality of pipes disposed along the sides and bottom of the hopper with a plurality of air outlets therein. That system could be used with that of the instant invention if desired.

Figure 2:
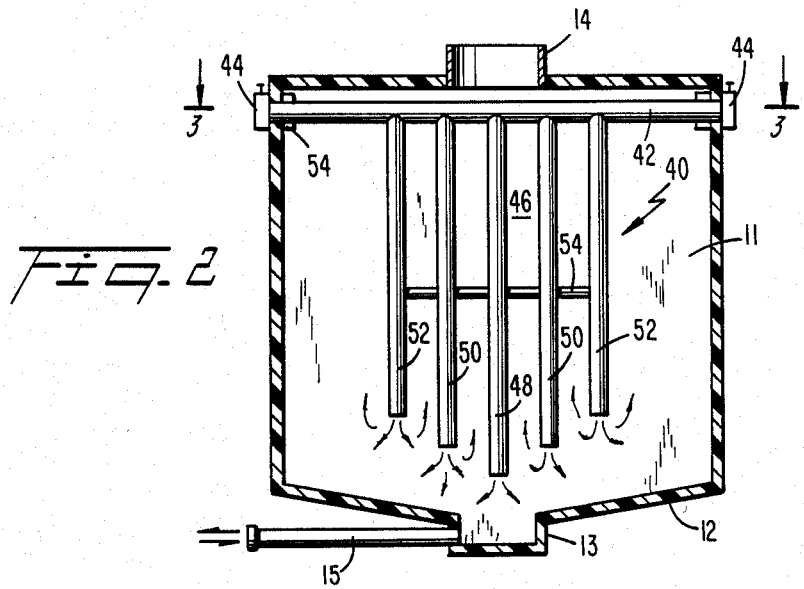
Figure 3:
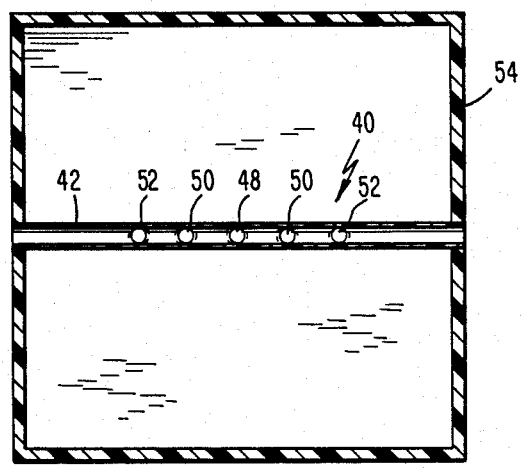

When water was admitted to the hoppers 12 through couplings 15 even with air agitation through conduits 24 by the prior art method, as the water rose it tended to meander through the powder material leaving pockets or clumps of dry materials which, even in an overnight soak, would not wet out. Recycling was somewhat effective in breaking up these "clumps". With attention to FIGS. 2 and 3, it has been discovered however that the device of this invention 40 can effectively aerate the center of a hopper compartment whereby water admitted through conduit 15 will rise through the center of the hopper compartment and effectively avoid clumping and the like as the material is wet out.

The device 40 preferably comprises a manifold 42 which extends laterally across the hopper car with one device 40 of this invention for each compartment therein. External valves 44 are provided to hook the manifold 42 to a source of compressed air (not shown). Two valves 44 are provided so that the manifold can be fed from either side of the car. Obviously, during operation, one valve 44 will be closed and the other opened.

Air is admitted through manifold 42 into a "pipe organ" assembly 46. Assembly 46 preferably comprises a central conduit 48 which extends downwardly to a distance of about one foot from the bottom of the car and alternate pairs of conduits 50 and 52 are spaced away from the central conduit 48 by central spacers 54.

Typically, each conduit in pipe organ 46 will be spaced about 8 inches from each adjacent conduit with conduits 52 being 10 feet long, conduits 50 being 11 feet long, and conduit 48 being 12 feet long. Typically, the pipe organ assembly 46 and manifold 42 are supported on a frame 54 mounted in any conventional fashion within the hopper car 10 and are of a plastic material such as polyvinyl chloride.

During operation, air is admitted through a valve 44 under high pressure such as 80 to 100 psig. At the same time, water is admitted through conduit 15 into box 13. The combined agitation of the air flow exiting through conduits 48, 50 and 52 with the water rising from box 13 facilitates creation of a slurry in the center of the compartment 11. Water then rises partially by capillary action along the pipe organ 46 so that the combined action of the air being directed near the floor 12 and the capillary action causes the center of compartment 11 to slurry first. This has been found to greatly facilitate slurrying of the dry bulk powder contents of car 10 so that the slurry can then be removed via conduit 15 or, if desired, a separate discharge (not shown).

The invention may be embodied in other specific forms without departing from the spirit or essential characteristics thereto. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. In a device for in-car slurrying of dry bulk powder in a hopper car having individual hopper compartments filled with said powder and means at a bottom of each compartment for admitting water to a compartment interior, the improvement comprising:

a manifold mounted across an upper portion within each compartment and means coupled to said manifold for admitting air under pressure thereinto;

a plurality of mutually spaced conduits extending downwardly from the manifold a predetermined distance, said conduits in communication with said manifold and opening adjacent the bottom of said compartment whereby said conduits can aerate said powder as water is admitted into the compartments to form a slurry.

2. The device of claim 1 wherein said conduits are disposed in a center portion of each compartment.

3. The device of claim 2 wherein each conduit opens about twelve inches above the bottom.

4. The device of claim 1 wherein each manifold extends laterally across each compartment.

5. The device of claim 1 wherein five mutually spaced conduits are provided.

6. The device of claim 1, further including a plurality of spacer bars mounted between said conduits to maintain the mutual spacing therebetween.

7. In a device for in-car slurrying of dry bulk powder in a hopper car having individual hopper compartments filled with said powder and means at a bottom of each compartment for admitting water to a compartment interior, the improvement comprising:

a manifold mounted across an upper portion of each compartment and means coupled to said manifold for admitting air under pressure thereinto;

a plurality of mutually spaced conduits extending downwardly from the manifold a predetermined distance, said conduits in communication with said manifold and opening adjacent the bottom of said compartment whereby said conduits can aerate said powder as water is admitted into the compartments to form a slurry;

and further including a pair of valves mounted at opposite ends of the manifold and located outside the compartment respectively along opposite sides of the hopper for external operation.

8. The device of claim 7, further including a plurality of spacer bars mounted between said conduits to maintain the mutual spacing therebetween.

9. The device of claim 8, wherein said manifold extends within each compartment.

* * * * *